United States Patent [19]

Henry

[11] 3,716,782
[45] Feb. 13, 1973

[54] CAPACITANCE GAGE FOR MEASURING SMALL DISTANCES

[75] Inventor: John J. Henry, Oak Ridge, Tenn.

[73] Assignee: The United States of America as represented by the United States Atomic Energy Commission

[22] Filed: June 3, 1971

[21] Appl. No.: 149,678

[52] U.S. Cl. .............................324/61 R, 324/60 CD
[51] Int. Cl. ..............................................G01r 27/26
[58] Field of Search ......324/60 CD, 60 R, 61 R, 61 S

[56] References Cited

UNITED STATES PATENTS 3,584,297  6/1971  Koski...................................324/60 R
3,452,273  6/1969  Foster..................................324/61 S

*Primary Examiner*—Alfred E. Smith
*Attorney*—Roland A. Anderson

[57] ABSTRACT

This invention is a capacitance gage for measuring small distances wherein the frequency of an R-C oscillator is varied in proportion to changes in the capacitance responsive to changes in separation between a plate mounted with the gage and a grounded object whose distance is being measured. The gage plate is connected to the input of a Schmitt trigger circuit by means of a field effect transistor amplifier. The output of the Schmitt trigger circuit controls an electronic switch which alternately charges and discharges the probe capacitance in response to the output of the Schmitt trigger circuit between upper and lower voltage triggering levels and the charging frequency is taken in digital form at the output of the switch. The variable frequency output is suitable for high-accuracy, non-contact dimensional inspection with digital readout or direct computer processing. The gage further provides improved performance for medium to high-resistance materials and can be compensated to provide a low temperature drift.

9 Claims, 2 Drawing Figures

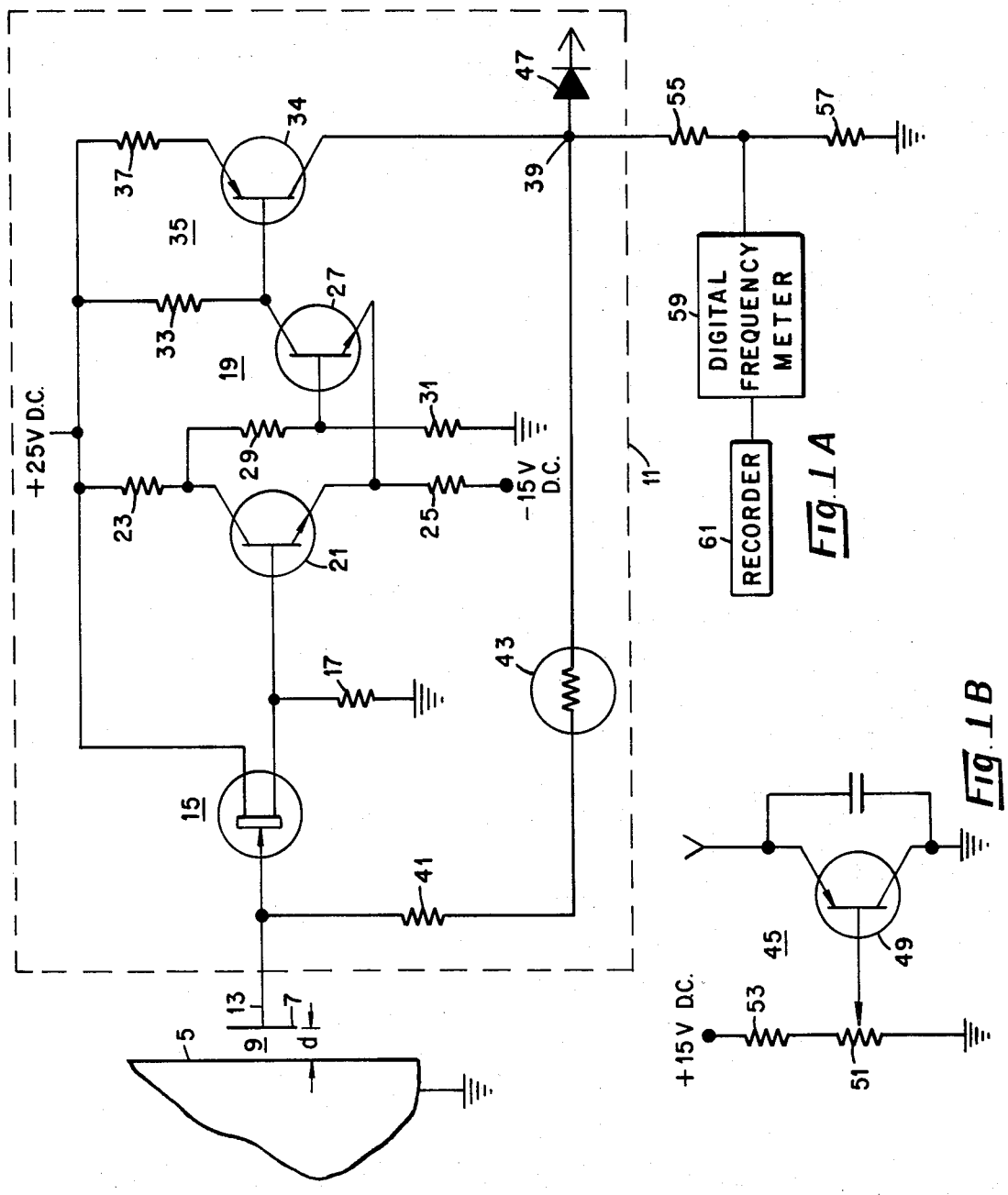

CAPACITANCE GAGE FOR MEASURING SMALL DISTANCES

BACKGROUND OF THE INVENTION

The present invention was made during the course of, or under, a contract with the United States Atomic Energy Commission.

This invention relates generally to apparatus for non-contact measurement of small distances and more specifically to an improved capacitance gage for measuring small distances which provides direct digital readout.

Capacitance gages have been used for non-contact dimensional inspection for a number of years. Several well known analog circuits such as the capacitance bridge, the resonant slope detector and the guarded impedance meter have been used in these measuring circuits. The circuit is used to measure an extremely small capacitance between the probe tip and the item to be inspected, with the output signal displayed on an analog meter or recorder. The basic means employed to measure these very low capacitances uses one of the following techniques: (1) the amplitude of an AC voltage or current is varied by the capacitor, converted to a DC signal and displayed; or (2) an oscillator frequency is varied by the capacitor, this frequency is then converted to a DC signal and displayed. All of these systems are basically analog instruments and, even in the existing oscillator types, it is necessary to convert from an analog to a digital signal for computer processing. Most of the existing oscillator types are active only for a limited range in the operating region, and they show gross non-conformity near contact with the part. This problem makes accurate absolute dimension measurement extremely difficult due to the difficulty in obtaining an absolute zero. With the advent of the digital computer for data processing, it is advantageous to use a digital readout, such as a variable frequency, directly into the computer in order to avoid the errors introduced in converting first to a DC signal and then from the analog to a digital signal. As previously mentioned, however, existing variable-frequency capacitance gages lack the accuracy, stability, and conformity necessary to advantageously use digital data processing.

Other variable frequency measuring devices such as those based on the Wein bridge principle, are known in the art in which the gate capacitance is used as the variable element of a Wein bridge R-C oscillator. These circuits are complicated by the requirement of zero phase shift and nearly equal amplitudes at the bridge midpoints. The zero phase shift requirement demands that the phase angle through the two halves of the tuned side of the bridge must be equal and opposite, thus limiting the measurement range of this type gage. The probe plate size in gages of this type limits the range of sensitivity, as the distance from the part increases substantially in proportion to the probe plate area the gage becomes relatively insensitive.

In addition both the LR and Wein bridge-type gages exhibit a reciprocal square root theoretical calibration curve which increases the curvature of the equation causing more stringent requirements on frequency stability and conformity at the greater separation distances; and are not extrapolatable to zero separation distance making absolute distance calculation difficult.

SUMMARY OF THE INVENTION

In view of the deficiencies in capacitance type distance gages of the prior art, it is an object of this invention to provide an improved capacitance gage with direct digital output.

Another object of this invention is to provide a capacitance gage of the variable frequency type with improved accuracy for non-contact dimensional inspection with digital readout.

Yet another object of this invention is to provide a capacitance gage which provides improved performance for gaging medium to high resistance materials.

Still another object of this invention is to provide an improved capacitance gage which can be readily compensated to provide a low temperature drift.

These and other objects of the present invention are generally achieved in a distance gage for measuring the distance of an electrically grounded object from a gage plate of the gage, wherein: a fixed resistance circuit means is connected to the gage for providing a charging current to the capacitance formed by the spacing between the object and the plate; a buffer amplifier having a high input impedance and a low output impedance connects the gage plate to the input of a trigger circuit; a switching means is connected to the output of the trigger circuit which switches said charging current "off" and "on" in response to the activation of the trigger circuit each time the capacitance is charged to a predetermined level; and digital recording means is connected to the charging circuit for recording the charging frequency of the capacitance, whereby a change in capacitance in response to a change in the spacing between the gage plate and the object is recorded as a proportional change in charging frequency.

Other objects and many of the attendant advantages of the present invention will be obvious from the following detailed description taken in conjunction with the accompanying drawings wherein FIGS. 1A and 1B show a detailed circuit diagram of a capacitance gage according to the present invention.

DETAILED DESCRIPTION

Referring to the drawing, an electrically grounded workpiece 5, the surface of which is to be measured without touching the workpiece, is arranged close to a sensing means in the form of a capacitance probe 7. The probe 7 is preferably in the form of a circular disk plate which forms one element of a capacitor 9 with the workpiece as the other element.

A typical probe design includes a ¾-inch diameter metal tube (not shown) which houses a printed circuit board containing the electronics shown enclosed by dotted lines 11. The probe plate 7 may be attached to the circuit board by means of a threaded shaft 13, extending from one end of the tube so that a replaceable gage plate of any desired size may be attached to the threaded shaft. The size and shape of the gage plate 7 affects the gage sensitivity and gaging range. Gaging plates from 3/16-inch in diameter to 1 inch square have been used with excellent results, but the more common sizes are ⅜, ½ and ¾ inch in diameter.

The circuit board with attached cable extending from the opposite end of the tube may be potted into the tube in a conventional manner or mounted between Teflon end seals depending upon the application. The tube may be connected to system ground in order to insure proper shielding.

The shaft 13 is connected to the gate of a field effect transistor (FET) amplifier 15 which has the drain connected to a regulated positive voltage source, typically +25 volts DC, and the source connected to ground through a variable source resistor 17. The output of amplifier 15, taken at the source, is connected to the input of a Schmitt trigger circuit 19. The Schmitt trigger circuit is of a design wherein the input is connected to the base electrode of a first transistor 21 which has the collector connected to the + volt DC source through a resistor 23 and the emitter connected to a regulated negative DC voltage source through a resistor 25. The output of the first transistor 21, taken at the collector, is connected to the base electrode of a second transistor 27 through a voltage divider network of series resistors 29 and 31 connected between the collector of transistor 21 and ground potential. The emitters of transistors 21 and 27 are connected in common and the collector of transistor 27 is connected to the + volt DC source through resistor 33. The output of the Schmitt trigger circuit, taken at the collector of transistor 27 is connected to the input of an electronic switch 35. The switch 35 consists of a single transistor 34 having its base electrode connected to the output of trigger circuit 19 and its emitter connected to the + volt DC source through a resistor 37. The output of switch 35, taken at the collector of transistor 34, is connected to a point 39 in the circuit.

The charging voltage at point 39 for capacitor 9 is supplied through the switching transistor 34 when it is conducting and is applied to plate 7 by means of a charging circuit consisting of a resistor 41 and a temperature compensating thermistor 43 serially connected between point 39 and shaft 13. The charging circuit further consists of a voltage calibration circuit 45 connected to point 39 through a voltage clamping diode 47 with the anode of diode 47 connected to point 39. The calibration circuit (FIG. 1B) consists of a transistor 49 having its emitter connected to the cathode of diode 47 and its collector connected to ground. The base of transistor 49 is connected to the wiper of potentiometer 51 which supplies a voltage to the base of the calibrate circuit transistor 49 which then acts through its emitter circuit and diode 47 as a clamp on any positive going voltage at the output of the electronic switch (point 39). The value of the clamping voltage is established by connecting one end of potentiometer 51 to ground and the other end to a source of positive voltage (typically +15 volts DC) through a series resistor 53.

The purpose of the calibration circuit 45 is to provide adjustment for the DC charging voltage impressed on point 39 when transistor 34 is conducting. The voltage limit at which diode 47 clamps is determined by the setting of potentiometer 51, typically in the range of between 6 and 15 volts positive.

The output signal from the circuit is also taken at point 39. A pair of series resistors 55 and 57 may be connected between point 39 and ground, thereby providing a voltage divider for a readout device, such as a digital frequency meter 59 or computer input connected to the common connection between resistors 55 and 57. The output of meter 59 may be recorded if desired on a conventional digital recorder (or printer) 61 connected to meter 59.

In operation, the regulated voltage applied to the collector of transistor 34 is limited at point 39 to a moderate positive voltage of about 16 volts depending upon the setting of potentiometer 51. This limited voltage or "calibrate" voltage, is applied to the gage plate 7 through thermistor 43 and resistor 41 so as to charge the variable gaging capacitor 9 of the probe. The charging voltage on capacitor 9 is sensed at the gate of FET 15 which acts as a buffer amplifier. Since FET 15 operates with about +1.2 volt bias from source to gate, FET 15 will begin to conduct when the circuit is first energized and vary the voltage dropped across resistor 17 which is the input to the Schmitt trigger circuit 19. The FET buffer amplifier 15 is used to couple the R-C circuit of the gage to the required low input impedance of the Schmitt trigger circuit 19. As a result, when the voltage on capacitor 9 is about +4.8 volts, the conduction through FET 15 is sufficient to provide a voltage drop across resistor 17 which exceeds the upper voltage triggering level of the Schmitt trigger circuit 19. When the Schmitt trigger circuit 19 triggers at the upper level, it turns "off" the electronic switch 35 (transistor 34), causing point 39 to go toward ground potential. Capacitor 9 then discharges through resistors 41, 43, 55 and 57 until the output of amplifier 15 reaches the lower triggering voltage level of Schmitt trigger 19 (about 3.4 volts across capacitor 9). The Schmitt trigger 19 then turns the switch 35 back "on", applying the "calibrate" voltage to the input R-C circuit and repeating the cycle.

The alternate application of the positive voltage and ground potential is repeated at a definite period determined by the value of the "calibrate" voltage (point 39), the value of the series resistor 41, the voltage levels of the upper and lower Schmitt triggering points, and the value of the active element-capacitor 9. The output read by meter 59 is the frequency or period of the switching between these two stable states and for the circuit shown is typically in the range from 0–600 Khz. The output is a constant amplitude square wave the frequency of which varies in proportion to the distance (d) between the grounded object 5 and the probe gage plate 7. The requirements for good stable operation of this circuitry determine the circuit configuration and operating conditions. The most satisfactory input buffer field effect transistor found was the commercially available 2N4416 supplied by Union Carbide Corporation, Electronics Division, San Diego, California. All other junction and metal oxide semiconductor FETs examined had too high an input capacitance, or input current leakage, or both.

The Schmitt trigger circuit is of a special design and requires well-regulated +25 and −15 volts power supplies for stable trigger levels. The upper level is determined primarily by the 25-volt supply and the resistors 23, 29 and 31. This path can be made very stable. The lower level is determined from the upper level by the collector current of transistor 27 in the "on" state. This path is made very stable using a large resistance in the emitter circuit (resistor 25) and a well-regulated −15 volts power supply.

The temperature characteristics of this probe may be adjusted by changing or adjusting the value of resistor 17 in the source lead of FET 15. Excellent agreement between stray input capacities and temperature response using a standard value resistor was obtained with this probe. Two designs of this probe have been verified, one employing a 4.7K source resistor 17 which optimizes the probe for wide temperature excursion and a probe using a 6.8K resistor which has a minimum temperature coefficient around room temperature operation. To offset temperature changes in the charging circuit impedance a 10K thermistor 43 is used in series with the charging circuit resistor 41.

The circuit configuration is such that zeroing is not required as in most non-contact measuring devices, since the output will be zero hertz when contact is made between the part 5 and the probe plate 7, regardless of other calibration factors. Calibration is accomplished by adjusting the output to a desired frequency when the probe plate and part are positioned a precise distance apart. The calibrating frequency is varied by changing the value of the charging voltage at point 39 by adjusting potentiometer 51.

Stability tests run on this probe yield an accuracy of ±0.1 mil at 40 mil separation of the input probe plate 7 from the grounded object 5 and the effect of temperature varied between 20° and 55°C was ±0.2 mil. The frequency stability of the oscillator of this probe built with all components designed for low drift is very good, being in the order of 1 part in $10^4$.

Due to the high input impedance, measurements to moderately resistive parts may be made with negligible calibration changes from a reference calibration on a good conductor object.

Accordingly, it will be seen that a highly accurate and simple non-contact capacitance gage has been provided which may be used for direct digital computer processing not only for dimensional inspection but for dielectric constant or dielectric homogeneity measurements of such materials as plastics, fiberglass resin compositions, and paint films, when a separate thickness measurement is made by other gaging methods and a conductive backing is provided. In this case, the dielectric constant is the ratio of the actual dielectric thickness to the (air calibrated) indicated thickness from the capacitance probe.

What is claimed is:

1. A distance gage for non-contact measurement of the distance of an electrically grounded object from a probe plate mounted with said gage, comprising:
   circuit means connected to said plate for providing a charging current to the capacitance formed by the spacing between said object and said plate;
   a buffer amplifier having a high impedance input and a low impedance output, said input of said amplifier being connected to said plate for sensing the charging voltage developed across said capacitance;
   a trigger circuit connected to the output of said amplifier and having predetermined upper and lower voltage triggering levels, said trigger circuit having an output whose signal level is switched in response to said upper and lower triggering levels;
   switching means connected to the output of said trigger circuit and charging circuit means for switching said charging current "off" and "on" responsive to the activation of said trigger circuit; and
   means connected to said charging circuit means for recording the charging frequency of said capacitance, whereby a change in said capacitance due to a change in the spacing between said object and said plate is recorded as a proportional change in charging frequency.

2. A distance gage as set forth in claim 1 wherein said buffer amplifier includes a field effect transistor having gate, source and drain, said gate connected to said gage plate and said drain connected to a highly regulated source of positive voltage; and a source resistor connected between said source and ground potential across which the output of said amplifier is taken.

3. A distance gage as set forth in claim 2 wherein said trigger circuit is a Schmitt trigger circuit having highly regulated upper and lower triggering levels.

4. A distance gage as set forth in claim 3 wherein said switching means includes a switching transistor having base, emitter and collector electrodes, said base electrode connected to the output of said Schmitt trigger circuit, said emitter electrode resistively coupled to said regulated power source and said collector electrode connected in series with said charging circuit means.

5. A distance gage as set forth in claim 4 wherein said charging circuit means includes a charging resistor connected between said emitter of said switching transistor and said gage plate.

6. A distance gage as set forth in claim 5 wherein said charging circuit means further includes a calibration circuit means connected between the collector of said switching transistor and ground potential for selectively controlling the charging voltage to said gage plate, thereby providing a predetermined operating frequency at a given spacing of said gage plate from the surface of said object.

7. A distance gage as set forth in claim 6 wherein said source resistor is a variable resistor, whereby the bias voltage on said field effect transistor may be varied so as to provide temperature compensation of the gage operating frequency.

8. A distance gage as set forth in claim 7 wherein said charging circuit further includes a thermistor connected in series with said charging resistor so as to stabilize the charging resistance for variation temperature during operation.

9. A distance gage as set forth in claim 8 wherein said recording means includes a pair of resistors serially connected between said emitter of said switching transistor and ground potential, thereby providing a discharge path for said capacitance when said switching transistor is in the non-conducting state and a digital frequency recording means connected to the common connecting point of said serially connected resistors.

* * * * *